Figure 1:
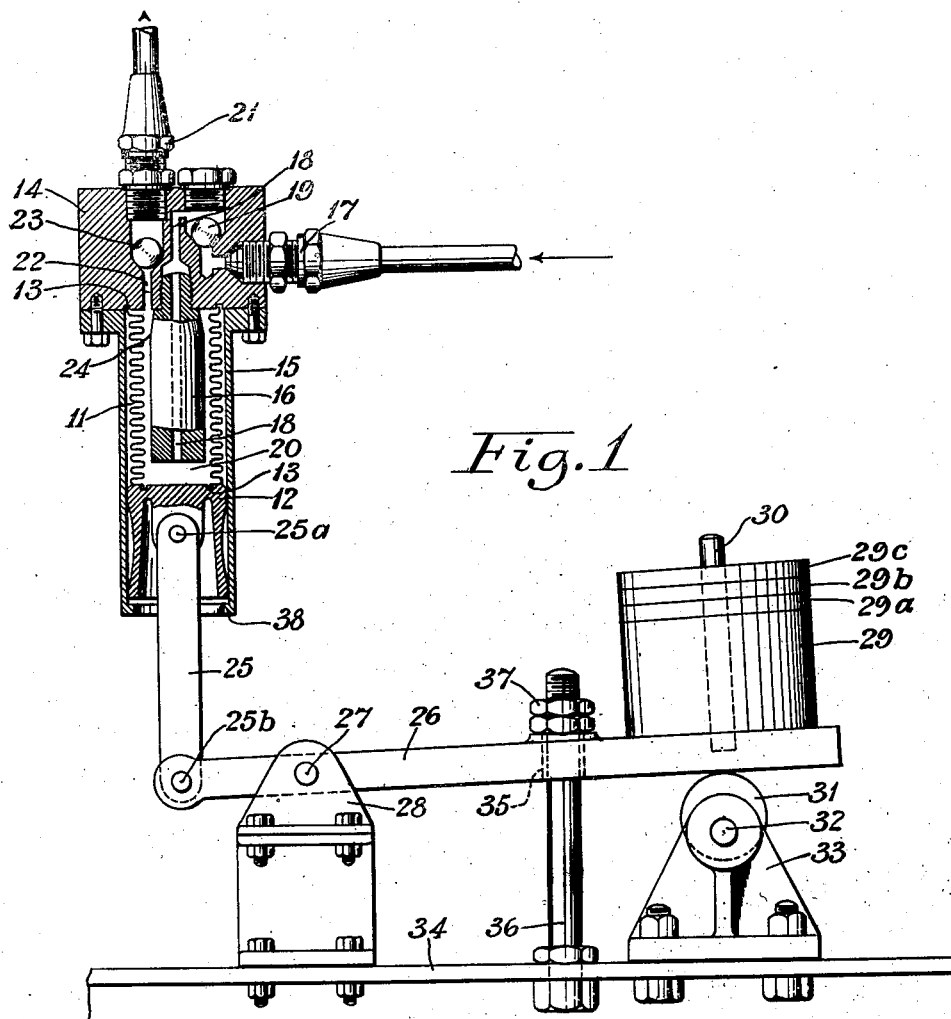

Nov. 21, 1939.   C. M. FIELDS ET AL   2,180,818
APPARATUS FOR MAINTAINING CONSTANT HYDROSTATIC PRESSURE UPON A LIQUID
Filed Feb. 3, 1938

Charles M. Fields
Reuben T. Fields   INVENTORS
BY   ATTORNEY

Patented Nov. 21, 1939

2,180,818

UNITED STATES PATENT OFFICE 2,180,818

APPARATUS FOR MAINTAINING CONSTANT HYDROSTATIC PRESSURE UPON A LIQUID

Charles M. Fields and Reuben T. Fields, Arlington, N. J., assignors to E. I. du Pont de Nemours & Company, Wilmington, Del., a corporation of Delaware Application February 3, 1938, Serial No. 188,466

2 Claims. (Cl. 103—148)

This invention relates to an apparatus for maintaining substantially constant hydrostatic pressure upon a liquid contained in a vessel of fixed volume during contraction in volume of the liquid in the vessel and, more particularly, relates to an apparatus for keeping a mold completely filled with a polymerizable organic liquid compound during the polymerization of such liquid and, also, maintaining a substantially constant hydrostatic pressure upon the liquid in the mold during the polymerization.

In C. M. Fields United States Patent 2,057,674, entitled "Polymerization process", is described the polymerization of polymerizable organic liquids. In general, this polymerization is carried out in a mold or vessel of fixed volume, polymerization being commenced at one closed end of the mold, usually the bottom, and the zone of polymerization is moved gradually to the opposite end of the mold as the polymerizable liquid is converted to solid polymer. The conversion of the polymerizable liquid to solid polymer is accompanied by appreciable shrinkage and, further, there is a tendency toward the formation of bubbles in the polymerizing liquid due to local overheating of the liquid being polymerized. It has been found desirable both to prevent formation of voids due to shrinkage and bubbles to maintain a pressure of the order of 50–300 pounds per square inch on the polymerizable liquid in the mold during polymerization; likewise, it is desirable to make use of the full volume of the vessel or mold employed and, to this end, to be able to introduce into the mold continuously throughout the polymerization additional polymerizable liquid to compensate for the shrinkage of the material undergoing polymerization in the mold.

Heretofore, various devices have been tried to accomplish the two-fold purpose of keeping the mold continuously full of polymerizable liquid and maintaining a substantially constant pressure upon the liquid in the mold. These polymerizable organic liquids which are used either as straight monomer or, more generally, as a viscous syrup of polymer dissolved in monomer, are substantially devoid of lubricating properties. Because of this characteristic of these liquids, the use of mechanisms having sliding metal-to-metal contacts or stuffing boxes where the polymerizable liquid has access, are unsatisfactory. No device heretofore tried has proven entirely satisfactory.

An object of the present invention is to provide an apparatus capable of maintaining a substantially uniform hydrostatic pressure upon a liquid contained in a vessel of fixed volume and undergoing contraction in volume and, at the same time, to keep the vessel filled by the introduction of further liquid. A more particular object of the invention is to provide such an apparatus capable of maintaining a substantially uniform hydrostatic pressure upon a polymerizable liquid undergoing polymerization in a constant volume mold while, at the same time, keeping the mold filled by the introduction of further polymerizable liquid.

A still further object of the invention is to provide an apparatus as above characterized in that:

(1) It shall not give rise to contamination of the polymerizable liquid;

(2) It shall be free from sliding metal-to-metal contacts and from packings;

(3) It shall provide for the positive escape of air so as neither to become bound by air nor to feed air into the mold;

(4) It shall involve no dead space in which the polymerizable liquid can be stationary with risk of ultimately polymerizing sufficiently to cause a stoppage;

(5) It shall be capable of maintaining a substantially constant hydrostatic pressure up to several hundred pounds per square inch upon the liquid in the mold, and require no accumulator; and (6) It shall keep the mold filled with polymerizable liquid at all times during the polymerization by feeding in liquid to compensate for the contraction in volume of the liquid in the mold as a result of its polymerization, i. e., it shall be capable of making a variable delivery of liquid against constant pressure and that it shall be capable of doing this without resort to a safety valve or other device for bleeding away excess pressure.

A still further object is to provide an apparatus that is automatic in its action so that it functions without attention and without the need of shutting off and restarting the mechanism which activates it. A still further object is to provide a simple and readily operated accessory apparatus with which to conduct processes of polymerization of polymerizable organic liquids in molds, such as the process disclosed in the above mentioned United States Patent 2,057,674. Other objects of the invention will be apparent from the description given hereinafter.

The above objects are accomplished according to the present invention broadly by the use of an apparatus comprising a bellows pump, conduit means connecting the bellows pump to a supply of liquid, said conduit means having a check valve therein, and a second conduit means connecting the bellows pump to the vessel in which the constant pressure is to be maintained, the second conduit means also having a check valve therein, and automatic means for actuating the bellows pump only when the pressure in said vessel is below a pre-determined point.

Figure 2:
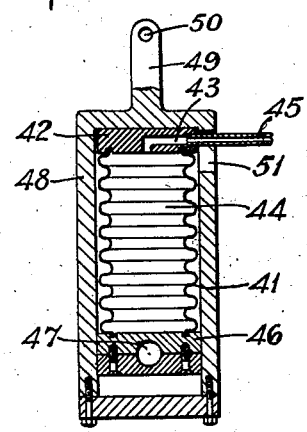

The invention will be described in detail with reference to the accompanying drawing wherein:

Fig. 1 is a more or less diagrammatic view, partly in front elevation and partly in vertical section, of an apparatus according to one specific embodiment of the present invention; and Fig. 2 is a more or less diagrammatic view, in vertical section, of a compressible connecting rod adapted for use in the apparatus illustrated in Fig. 1.

Referring to Fig. 1, reference numeral 11 designates a cylindrical bellows member, preferably made of two-ply nickel plated brass, but other suitable metals or materials impervious to the liquid being handled will occur to those skilled in the art, closed at one end by a piston 12 by soldering the end of the bellows member 11 into the groove 13 cut in the face of the piston 12. The other end of the bellows member 11 is similarly closed off by being soldered in a groove 13 cut in the lower face of the block 14. To the block 14 is attached the cylindrical sleeve 15 in which the piston 12 makes a sliding fit.

A cylindrical plug 16 is threadably mounted on the block 14 and extends into and fills most of the space within the bellows member 11. The plug 16 must be smaller in diameter and length than, respectively, the minimum diameter and length of the interior of bellows member 11, as assembled, to leave a space 20 for the passage of liquid within the bellows member 11.

A conduit means connecting the interior space 20 of bellows member 11 with an outside source of liquid is provided by the intake port 18 drilled from the bottom of plug 16 through the plug 16 and through the block 14 and terminating in the coupling 17 for the attachment of a supply pipe. The ball check valve 19 is placed in the port 18 to permit flow of liquid into the space 20 and to check flow of liquid in the opposite direction.

A second conduit means connecting the space 20 within the bellows member 11 to the vessel (not shown) in which the constant hydrostatic pressure is to be maintained, is provided by the discharge port 22 drilled through the block 14 and terminating in the fitting 21 adapted to be connected with the aforementioned vessel. The port 22 leads into the space 20 between the bellows member 11 and the outer wall of the plug 16, the plug 16 being tapered at 24 to provide greater room for the opening of the port 22. The ball check valve 23 is placed in the port 22 to permit flow of liquid from the space 20 out through port 22 and fitting 21 but to check flow of liquid in the opposite direction.

To the underside of the piston 12 is connected by means of the pin 25—a the connecting rod or link 25 which, at its other end, is similarly connected by the pin 25—b to the lever 26. This lever 26 is pivotally mounted on a shaft 27 journaled in the bearing block 28.

Removably mounted on the lever 26 at the opposite end from connecting rod 25, and preferably at several times greater distance from the fulcrum of the lever 26 at 27, are principal weight 29 and increment weights 29—a, 29—b, and 29—c, all of them drilled through so as to be slipped over a pin 30 mounted on the lever 26.

Beneath the lever 26 at the end carrying the weights is a cam 31 keyed to a shaft 32 rotatably mounted in a bearing member 33. This shaft 32 is driven at a low speed, preferably from about 5 to 50 R. P. M., by means of conventional motor and speed-reducing mechanism not shown in the drawing. Conveniently, the cam 31 is of circular cross section and is mounted eccentrically on the shaft 32.

Bearing members 28 and 33 are supported on a foundation member 34 which also supports the assembly including the sleeve 15 and block member 14. The supporting structure for the sleeve 15 and block 14 have been omitted from the drawing for the sake of clarity.

A hole 35 is provided in the lever 26 at a convenient point along its length and through this hole 35 is passed an adjustable stop member comprising a bolt 36 mounted on the foundation member 34 and provided with a locknut 37.

The operation of the apparatus shown in Fig. 1 will now be described in connection with the polymerization process disclosed in said United States Patent 2,057,674 as applied to the manufacture of rods, and the like, of polymerized methyl methacrylate.

The intake port 18 is connected, through the fitting 17, with a supply of partially polymerized syrup of methyl methacrylate which is located at such a level that the syrup will flow into the apparatus through the fitting 17. The shaft 32 carrying the cam 31 is then set into rotation. The cam 31 is capable of raising the weighted arm of the lever 26 and, accordingly, as the maximum radius of the cam 31 comes into vertical position above the bearing member 33, this arm of the lever 26 is raised to its highest position. Correspondingly, the bellows member 11, being actuated through the connecting rod 25, traveling downwardly, is expanded longitudinally. This increases the volume of the space 20 within the bellows member 11 and there is thus drawn into the bellows member 11 through the check valve 19 and the port 18, a quantity of the methyl methacrylate syrup.

As the cam 31 rotates to its other extreme position, the weighted arm of the lever 26 follows it downwardly, being actuated by the weight 29. This movement causes the piston 12 to rise and compress the bellows member 11, thereby decreasing the volume of the space 20 within the bellows member 11. The pressure thus produced upon the contents of the space 20 closes the check valve 19 and causes the check valve 23 to open for the discharge, at first, of air, but, ultimately, as the space 20 becomes filled by successive strokes of the piston rod 25, methacrylate syrup is discharged through the port 22, past the check valve 23 and into the fitting 21.

The partially polymerized syrup, which is preferred for the process of polymerization, is of sufficient viscosity, and the diameter of the port 18 is sufficiently small, so that air initially contained in the port 18 is pushed out ahead of the syrup, even vertically downward. Furthermore, the whole intake port 18, beginning at the fitting 17, has no part in which air can be trapped and remain out of the line of flow of the syrup; in particular, the horizontal portion of the port 18 above the check valve 19 is free from crown or crevice in which air might become temporarily trapped.

An elongated mold of fixed volume, such as described in said United States Patent 2,057,674, is filled with methyl methacrylate syrup and, as soon as the syrup free from air begins to issue from the fitting 21, the filled mold is connected with this fitting, the connecting members being designed and handled so that no air is introduced into the conduit while making the connection.

The apparatus of the present invention is now operating against the filled mold which is closed and of fixed volume. It therefore begins to build up hydrostatic pressure upon the liquid in the mold and the magnitude of such hydrostatic pressure is controlled by the magnitude of the weight 29 which causes the hydrostatic pressure to build up to a definite value and then maintains it at that value. Until this fixed value is reached each rotation of the cam shaft 32 causes a reciprocally vertical movement of the lever 26 because the weight 29, multiplied by its arm, is greater than the back pressure transmitted through the connecting rod 25, multiplied by its arm, and the weight 29 goes down each time the cam 31 revolves.

Ultimately, the pressure within the mold and bellows system, sealed by the check valve 19, is built up to the point at which it balances the downward thrust of the weight 29. The weight 29 then does not move downward with the next rotation of the cam, being held up by the downward thrust of this pressure, through the connecting rod 25, upon the opposite end of the lever 26. Actually, the weighted end of lever 26 does not remain balanced stationary in its extreme high position because any play in the bearings and any elasticity in the bellows member 11 permits it to drop a little when the support of the cam 31 is withdrawn, but such drop is not sufficient to cause an opening of the valve 23 nor a corresponding opening of the check valve 19 when the weighted end of the lever 26 is again raised to its top position by the cam 31. In this way the pressure developed by the apparatus upon the syrup in the mold cannot exceed the predetermined value controlled by the magnitude of the weight 29. As long as this pressure is maintained, the cam rotates idly.

But the polymerization of the methyl methacrylate in the mold results in a contraction in volume of the methyl methacrylate in the mold. This contraction effects a decrease in the hydrostatic pressure upon the contents of the mold. The check valve 23 is caused to open by the greater pressure still being maintained in the bellows member 11 by the downward thrust of the weight 29, and syrup is forced thereby from the space 20 past the check valve 23. The resulting reduction in pressure within the bellows member 11 permits it to be compressed by the upward thrust of the connecting rod 25, the weighted arm of the lever 26 thus following the cam downward, and the pressure building function of the apparatus is thus resumed, continuing until the hydrostatic pressure in the mold has again been built up to the fixed value or maximum governed by the magnitude of the weight 29.

It will be understood by those skilled in the art that the apparatus of the present invention serves not only to build up and maintain hydrostatic pressure at and not above a predetermined value, upon the contents of a mold or vessel of fixed volume but also to maintain this pressure in spite of the contraction in volume of the material within the mold as a result of the polymerization, though automatically feeding additional liquid into the mold in an amount sufficient to maintain the pressure at the desired point. While this feed is actually intermittent or pulsating, taking place only during the downward movement of the weight 29, yet, in actual practice, because of the elasticity of the mold, it has been found that the mechanism as described will build up and hold a hydrostatic pressure of, for example, 200 pounds per square inch with a fluctuation of not more than 5 pounds per square inch.

Two optional features of the apparatus as shown in Fig. 1 are a stop 38, conveniently a section of smaller inside diameter forming a part of the sleeve 15, and an adjustable stop member 36, 37. The purpose of both of these features is the same, namely, to limit the upward motion of the weighted arm of the lever 26 and, ordinarily, only one, rather than both, as shown, will be employed. Neither one functions so long as the proper weight 29 is in position upon the lever arm 26 but they serve as a safeguard at any time when the weight may be removed and during any period of operating the apparatus manually instead of by the cam.

In an alternate form of the apparatus of the present invention, the bellows member 11 and associated parts are employed with a compressible connecting member or rod, shown in Fig. 2, in combination with any conventional means such as a crank pin for giving said compressible connecting member reciprocating motion. The connecting rod 25, lever 26, and cam 31, with their associated parts, shown in Fig. 1, are not employed in this modification.

Referring to Fig. 2, a bellows member 41 is soldered to an upper plate 42 containing a port 43 which connects the interior 44 of the bellows member 41 through a pipe 45 to a source of gas pressure. The bellows member 41 is soldered at its lower end to a block 46 which is provided with the bearing hole 47 adapted to receive a crank pin, not shown, whereby the block 46 may be given a regular reciprocating vertical motion.

The bellows member 41 and associated parts fit within a frame 48 carrying the vertical arm 49 provided with a hole 50. By means of a connecting pin passing through the hole 50 of arm 49, the compressible connecting member is adapted to be connected with the piston 12 (Fig. 1). The bellows member 41 and associated parts are vertically slidable within frame 48, which is cut away at 51 to accommodate the projecting pipe 45. Alternatively, and without difference of function, the plate 42 can be rigidly mounted at the top of the frame 48, leaving the lower end of the bellows member 41 and the plate 46 attached thereto, vertically slidable within the frame 48.

The mechanism of Fig. 2 is attached to the piston 12 (Fig. 1) and the crank pin, not shown in the drawing, is inserted into the bearing hole 47. When suitable gas pressure is built up within the bellows member 41, the latter is thereby lengthened and the block 42 is forced into contact with the top of the frame 48. With the crank pin in the bearing hole 47 in stationary position at or near the bottom of its stroke and holding the block 46 in fixed position, the lengthening of the bellows member 41 also causes the frame 48 to move upward until the block 46 abuts against the bottom of the frame 48. When the crank shaft is in operation and sufficient gas pressure is held within the bellows member 41, the whole assembly of Fig. 2 moves upward and downward as a single unit.

On the downward stroke the crank pin pushes downward the frame 48 and thus lengthens the bellows member 11 (Fig. 1), causing the intake of liquid through the port 18. What happens upon the up stroke depends, however, upon the magnitude of the gas pressure within the bellows member 41. Compression of the bellows member 11 (Fig. 1), with consequent opening of the valve 23, requires the application of a force sufficient to overcome the liquid pressure existing on the far side of the valve 23. If the gas pressure within the bellows member 41 is sufficiently high to prevent the compression of this bellows 41 under this minimum force, then the up stroke of the crank pin will elevate the frame member 48, compress the bellows member 11 and cause a discharge of liquid through the valve 23. If, however, the gas pressure within the bellows member 41 is not sufficiently great, then the up stroke of the crank pin will merely compress this bellows member 41, so that its lower end, carrying the block 46, will move upward with respect to the frame 48, to such a position as is shown in Fig. 2, while the frame itself is not caused to rise, and there will be, correspondingly, no compression of the bellows member 11 and no discharge of liquid through the valve 23.

The amplitude of motion of the crank pin must, of course, be sufficiently restricted so as to avoid damage to the bellows member 41 by too great compression.

It is thus evident that against a given pressure in the vessel in which pressure is to be maintained constant, which is not shown in the drawing but which is located beyond the valve 23, the mechanism of Fig. 2 will cause the operation of the bellows member 11 as a pump only when the gas pressure within the bellows 41 is in excess of a certain critical value, and, conversely, that the maintenance of a uniform given gas pressure in the bellows member 41 will permit the mechanism as a whole to build up and maintain pressure beyond the valve 23 up to and at a definite uniform figure. In other words, the magnitude of the pressure which is maintained by the mechanism as a whole upon the liquid beyond the valve 23 is governed by the compressibility of the bellows member 41, which in turn is governed by the magnitude of the gas pressure within it.

The space 44 within the bellows member 41 is connected through the port 43 and pipe 45, to an intake valve furnishing gas under pressure, with an escape valve and a pressure gauge (these accessories not being shown in the drawing) so that the pressure within the space 44 may be maintained at the value which will effect the maintenance of the desired pressure upon the liquid in the closed vessel beyond the valve 23.

In normal operation, the gas pressure within the bellows member 41 will be maintained uniform, so as to maintain uniform pressure upon the liquid beyond the valve 23. But a change in the latter pressure can be effected, if desired, by changing the gas pressure in the bellows member 41. An increase in the latter immediately causes the mechanism to operate to increase the pressure on the liquid. On the other hand, a lowering of the gas pressure within the bellows member 41 does not immediately cause a reduction in the liquid pressure beyond the valve 23 because this valve is held closed by that pressure. But the polymerization of the liquid in the vessel beyond valve 23 is constantly causing contraction in the volume of that liquid, and the resulting reduction in pressure will presently lower the pressure therein to the desired new value, at which it will thereafter be held by the operation of the mechanism.

The mechanism shown in Fig. 2 is thus, in effect, an adjustable compressible connecting rod.

The purpose of the plug 16 (Fig. 1) is to reduce the chance of stagnation of the liquid within the bellows member 11. By reducing the liquid capacity of the bellows member 11, the plug reduces the duration of stay of a given portion of liquid within the bellows member 11. By effecting the entrance of the liquid near the bottom of the bellows member 11 and directing its travel upward through an annular space, a direct, nonstagnant flow is promoted and, incidentally, this insures positive and prompt expulsion of air at the start. A further advantage of the plug 16 is that it causes the liquid to travel in the immediate neighborhood of the expanding and contracting bellows wall which subjects it to a homogeneous agitation from that source and this is desirable in handling polymerizable liquids, particularly syrups of polymer dissolved in monomer.

In the drawing specific preferred embodiments of the invention have been shown and those skilled in the art will understand that numerous mechanical equivalents can be employed and the design of the apparatus varied considerably without departing from the spirit of the invention. Means other than the cam 31 could readily be employed for raising the weighted end of the lever member 26 in Fig. 1. Likewise, the compressible connecting member of Fig. 2 could be used as a compressible piston rod rigidly attached to or forming a continuation of the piston 12 of Fig. 1 and actuated by a rigid connecting rod or other means of giving reciprocating motion.

The mechanism of the present invention provides an automatic device for maintaining a substantially constant hydrostatic pressure upon the liquid contained in a mold or other vessel of fixed volume and, in its specific application to the polymerization of organic liquids which contract in volume during polymerization, it serves also to bring into such a mold, under pressure, increments of polymerizable liquid sufficient to make up for the contraction and thereby to keep the mold completely filled throughout the polymerization. The magnitude of the hydrostatic pressure applied by the mechanism is closely adjustable by varying the weight applied to the lever arm or by varying the pressure of gas maintained in the bellows member 41.

The liquid handled by the apparatus passes directly through its ports and bellows in such a manner as to expel air. The mechanism is free from sliding metal-to-metal contacts by which the liquid being handled might be contaminated and which would require for satisfactory operation a lubricating action which cannot be provided by liquids of the type for which the mechanism has been particularly designed. There are no packings, stuffing boxes, or release valves, and the mechanism requires no accumulator for the maintenance of pressure. The mechanism gives a variable play under constant pressure. A particular advantage of the apparatus is that it contains, in those parts through which the liquid passes, no zones of stagnation or dead spots in which a polymerizable liquid could remain long enough to undergo an objectionable polymerization which might interfere with the functioning of the device.

The present invention thus provides an apparatus meeting the aforementioned requirements as a pressure-maintaining and feeding device for use in connection with the polymerization of organic liquids in accordance with such process as that set forth in the aforementioned United States Patent 2,057,674.

As many apparently widely different embodiments of this invention may be made without departing from the spirit and scope thereof, it is to be understood that the invention is not limited to the specific embodiments thereof except as defined in the appended claims.

We claim:

1. An apparatus comprising the combination of a vertically disposed bellows member, a piston member forming a liquid-tight enclosure at the lower end of said bellows member, a stationary block forming a liquid-tight closure at the upper end of said bellows member, a plug carried by said block and occupying a substantial part of the space within said bellows member but having length and width, respectively, less than the minimum length and width of said bellows member, an intake port extending from the lower end of said plug through said plug and through said block, a check valve in said intake port permitting flow of liquid only into said bellows member, a discharge port extending through said block from a point within said bellows member and outside of said plug, a check valve in said discharge port permitting flow of liquid only out of said bellows member, means for guiding and restricting said piston member to vertical movement only and automatic means connected with said piston member for actuating said bellows member only when the pressure against which liquid is to be delivered, is below a predetermined point.

2. An apparatus comprising the combination of a vertically disposed bellows member, a piston member forming a liquid-tight enclosure at the lower end of said bellows member, a stationary block forming a liquid-tight closure at the upper end of said bellows member, a plug carried by said block and occupying a substantial part of the space within said bellows member but having length and width, respectively, less than the minimum length and width of said bellows member, an intake port extending from the lower end of said plug through said plug and through said block, a check valve in said intake port permitting flow of liquid only into said bellows member, a discharge port extending through said block from a point within said bellows member and outside of said plug, a check valve in said discharge port permitting flow of liquid only out of said bellows member, means for guiding and restricting said piston member to vertical movement only, and means for actuating said piston member.

CHARLES M. FIELDS.
REUBEN T. FIELDS.